US008669320B1

(12) United States Patent
Kemeliotis

(10) Patent No.: US 8,669,320 B1
(45) Date of Patent: Mar. 11, 2014

(54) WATER-BORNE SPRAY ADHESIVE

(75) Inventor: Cera L. Kemeliotis, Mentor, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 247 days.

(21) Appl. No.: 12/908,242

(22) Filed: Oct. 20, 2010

Related U.S. Application Data

(60) Provisional application No. 61/253,284, filed on Oct. 20, 2009.

(51) Int. Cl.
*C08F 220/10* (2006.01)
*C08K 5/05* (2006.01)
*C08K 5/01* (2006.01)

(52) U.S. Cl.
USPC ........... 524/556; 524/903; 524/390; 524/926; 524/725

(58) Field of Classification Search
USPC .......................... 524/556, 903, 390, 926, 725
See application file for complete search history.

(56) References Cited

U.S. PATENT DOCUMENTS

| 4,036,673 | A | * | 7/1977 | Murphy et al. ............ 156/71 |
| 4,381,066 | A | * | 4/1983 | Page et al. ............ 222/394 |
| 5,196,468 | A | | 3/1993 | Schwerzel et al. |
| 5,969,025 | A | | 10/1999 | Corzani |
| 6,346,234 | B1 | | 2/2002 | Rollat et al. |
| 6,797,051 | B2 | * | 9/2004 | Woods ............ 106/802 |
| 7,427,644 | B2 | | 9/2008 | Silvers et al. |
| 7,713,365 | B2 | | 5/2010 | Silvers et al. |
| 2004/0147663 | A1 | * | 7/2004 | Silvers et al. ............ 524/501 |

FOREIGN PATENT DOCUMENTS

| EP | 0419242 A1 | | 3/1991 |
| JP | 60199086 A | * | 10/1985 |
| JP | 05043854 A | * | 2/1993 |
| WO | WO 9812248 A1 | * | 3/1998 |

OTHER PUBLICATIONS

JP 05043854 A, Feb. 1993, Derwent Ab.*
JP 60199086 A, Oct. 1985, Derwent Ab.*
"Industrial Aerosol Adhesives and Chemicals", www.3M.com/adhesives, 2005, U.S.A.

* cited by examiner

*Primary Examiner* — Satya Sastri
(74) *Attorney, Agent, or Firm* — Deron A. Cook; Robert E. McDonald; Eryn Ace Fuhrer

(57) ABSTRACT

A sprayable adhesive composition may be made from the blend of a low Tg acrylic resin, water, and one or more water miscible organic solvents disposed in a container with one or more hydrocarbon propellants. The adhesive is stable in the presence of the hydrocarbon propellants. An adhesive delivery system for storing and discharging the adhesive compositions of the present invention are also taught.

9 Claims, 1 Drawing Sheet

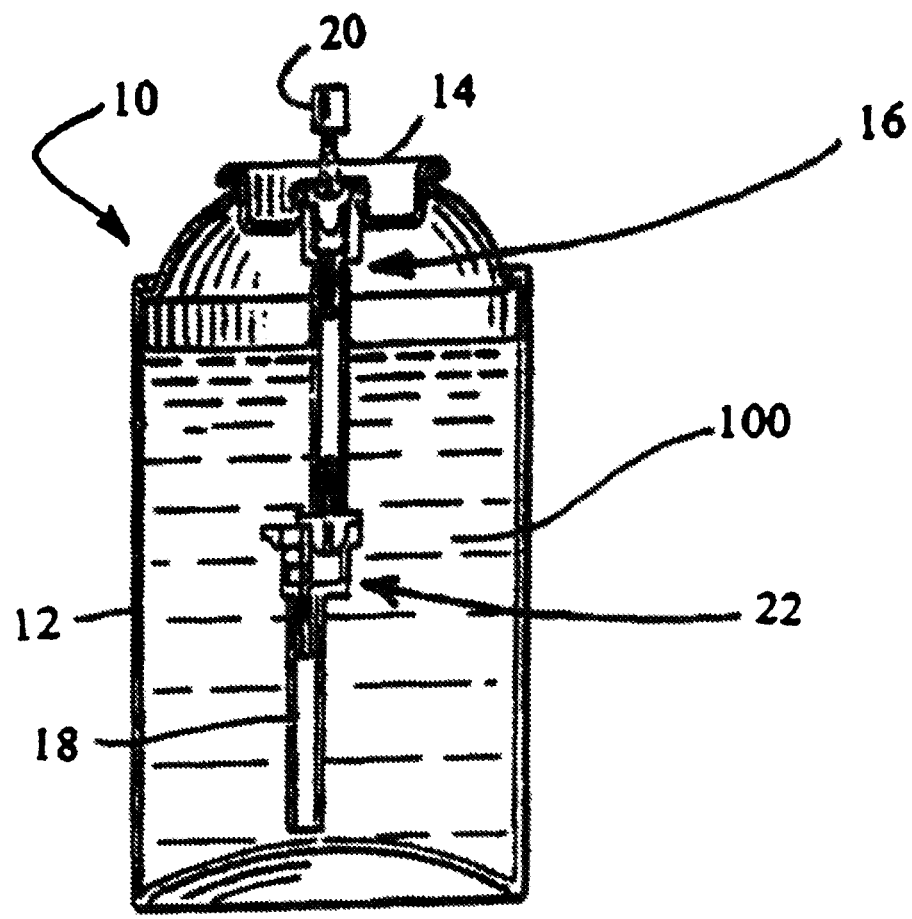

WATER-BORNE SPRAY ADHESIVE

This application claims priority to U.S. Provisional Patent Application 61/253,284 filed on Oct. 20, 2009, the entirety of which is incorporated herein by reference.

DESCRIPTION OF THE DRAWINGS

FIG. 1 is a cross-sectional plan view of an exemplary adhesive container.

DETAILED DESCRIPTION OF THE INVENTION

The present invention relates to adhesives, and more particularly to sprayable adhesive compositions.

It is a particular object of the present invention to provide a water-borne, acrylic emulsion based adhesive composition that is sprayable at pressures of less than about 70 pounds per square inch (p.s.i.) and that is stably compatible over a useful storage period with saturated hydrocarbon propellants.

In accordance with the present invention, a spray adhesive composition comprises the blend of:
a) a low Tg acrylic emulsion;
b) a solvent blend comprising water and an alcohol; and
c) a hydrocarbon propellant.

In accordance with another embodiment of the present invention, a spray adhesive composition comprises the blend of:
a) a resin emulsion wherein the resin in the emulsion consists essentially of a low Tg acrylic resin;
b) a solvent blend comprising water and a water miscible organic solvent; and
c) a hydrocarbon propellant.

In accordance with still another embodiment of the invention, a spray adhesive composition comprises the blend of:
a) from about 25 to about 30 percent by weight of an acrylic resin having a Tg from about minus 40° C. to about minus 20° C.
b) from about 6 to about 10 percent by weight of an alcohol;
c) from about 6 to about 10 percent by weight of water;
d) from about 15 to about 45 percent by weight of at least one hydrocarbon propellant; and
e) up to about 5 percent by weight of other additives.

According to still another embodiment, an adhesive application system comprises a canister having a canister body and a nozzle, the canister body enclosing an adhesive composition and a propellant, wherein the adhesive composition comprises (a) a resin system consisting essentially of a low Tg acrylic resin emulsion, (b) water and (c) an alcohol and wherein the propellant is a hydrocarbon propellant.

An acrylic resin emulsion that is particularly useful in the practice of the invention comprises an emulsion in water of an acrylic resin that is the reaction product of a monomer blend consisting essentially of (meth)acrylate monomers. For purposes of clarity the term (meth)acrylate, refers to both methacrylate and acrylate. Particularly useful (meth)acrylate monomers include the C1-C6 alkyl (meth)acrylates, and more usefully, the C2-C4 alkyl (meth)acrylates. Suitable alkyl (meth)acrylate monomers may include methyl (meth)acrylate, ethyl (meth)acrylate, butyl and isobutyl (meth)acrylate monomers. Acrylic resins comprising the reaction product of C4 alkyl (meth)acrylates are particularly useful, and still more useful are those resins which are the reaction product of butyl acrylate and isobutyl methacrylate.

Commercially available acrylic emulsions sold under the tradename Carbotac®, from Lubrizol Advanced Materials, are particularly useful. The term "low" Tg refers to a glass transition temperature (measured by Differential Scanning calorimetry) of between about minus 40° C. and about minus 20° C., more usefully, about minus 35° C. to about minus 25° C. The resin particles will preferably have a particle size in the range of about 100 to, about 800 nm, most usefully, about 250 to about 750 nm, and still more usefully, about 450 to 550 nm. Particle size may be measured by Malvern Nano-Sizer.

In addition to the acrylic resin emulsion, the adhesive compositions may include one or more water miscible organic solvents. Particularly useful organic solvents are the C2-C4 alkanols. However, other useful water miscible solvents may be used in some embodiments, such as other alcohols and glycol ethers. Particular preference is given to isopropyl alcohol. Water miscible solvents may be used in amounts from about 5 to about 25 weight percent (with respect to total composition), more usefully about 6 to 10 weight percent. The amount of solvent used may depend upon the viscosity that is desired.

In addition to water, the acrylic resin emulsion, and the water miscible solvent, the adhesive compositions of the present invention may include one or more additives, such as defoamers, pigments, rheological modifiers, stabilizers, and, where appropriate, corrosion inhibitors.

Suitable rheology modifiers which optionally can be included in the adhesives of this invention representatively include organoclays, fumed silica, dehydrated castor oil organic derivatives, English China Clay; polyamides, polyamide modified alkyds, alkylbenzene sulphonate derivatives, aluminum, calcium and zinc stearates, calcium soyate, associative thickeners and the like.

Useful defoamers include siloxane-type defoamers. Used commercially available defoamers are available under the Foamex and Airex trademarks from Evonik (such as Airex 901W). Other commercially available defoamers may include BYK series defoamers available from Byk-Chemie. Where used, the defoamer may be present in amounts from about 0.2 to about 1.0 weight percent (with respect to total composition).

The adhesive composition preferably has a pH in the range of between about 8 to 11, more usefully about 9 to 10. To adjust the pH of the adhesive composition, it may be appropriate to add ammonium hydroxide.

It is contemplated that the preferred method of applying the adhesives of this invention is by aerosol spray. FIG. 1 shows a schematic of a representative aerosol container charged with an adhesive composition prepared in accordance with this invention. In preparing a spray adhesive composition, the adhesive composition of this invention is added to a container, such as container 10 shown in FIG. 1, and then a propellant is added to form the spray adhesive composition.

Referring now to FIG. 1, the container 10 comprises a can 12, to which a valve cup 14 is secured. A valve assembly 16 with a dip tube 18 connected thereto is secured to the valve cup 14. The dip tube 18 extends into the interior of the can 12 and is in contact with the aerosol adhesive composition, which is designated by the numeral 100. The can 12 may typically be composed of aluminum or tin plated steel. If desired the can may be lined or coated to minimize corrosion while in contact with the water borne adhesives. The valve cup 14 may be sealed to the can 12 and the propellant charged through the valve assembly 16, or the can 12 may be charged with the propellant under the valve cup 14, and then the valve cup 14 sealed to the can 12. An actuator 20 is then connected to the valve assembly 16.

Various valves, dip tubes and actuators may be used to spray the adhesive composition. For many applications, the dip tube 18 is a standard dip tube having a diameter of about 0.147 inches. The valve assembly 16 may be either a "female" aerosol valve or a "male" aerosol valve. Examples of "female" aerosol valves that may be used in the present invention are disclosed in U.S. Pat. Nos. 3,033,473; 3,061,203; 3,074,601; 3,209,960; and 5,027,985. Examples of "male" aerosol valves that may be used in the present invention are disclosed in U.S. Pat. Nos. 2,631,814, and 4,572,406. For some applications, the valve assembly 16 is a "female" valve with a spray controller 22 having a construction as disclosed in U.S. Pat. No. 4,572,406, which is hereby incorporated by reference. The spray controller 22 permits the aerosol adhesive composition 100 to be dispensed when the container 10 is inverted.

It is contemplated in some embodiments, that the adhesive composition will be blended with one or more propellants and stored in a pressurizeable can as discussed above. It is useful, when storing the adhesive composition in a metal container, to include one or more corrosion inhibitors. The corrosion inhibitors may be liquid phase or vapor phase corrosion inhibitors. In some embodiments, it is useful to use a blend of liquid phase and vapor phase corrosion inhibitors.

Particularly useful liquid phase corrosion inhibitors may include sodium nitrite and sodium benzoate. Liquid phase corrosion inhibitors may be used in amounts from about 0.1 to about 1.0 weight percent with respect to total composition weight including propellants.

Particularly useful vapor phase corrosion inhibitors may include ammonium hydroxide. Vapor phase corrosion inhibitors may be used in amounts from about 1 to about 2 weight percent with respect to total composition weight including propellants.

The blend of the resin emulsion, solvents and liquid phase additives will most usefully have a sprayable viscosity, which is a viscosity in the range of between about 40 to 50 KU (measured by Stoner Krebs Viscometer).

The present invention is directed to a spray adhesive and therefore, it is contemplated that the adhesive compositions described above will be blended with an aerosol propellant suitable for expelling the adhesive from a container. The propellant is a liquefiable gas having a vapor pressure sufficient to propel the adhesive composition from the container.

The waterborne adhesive compositions described above are stable, even in the absence of added resin disperants, when blended with saturated hydrocarbon propellants, exemplified by methane, ethane, propane, n-butane and iso-butane and mixtures thereof. Accordingly, in some embodiments, it is particularly useful to use, as a propellant, a hydrocarbon propellant, and more particularly a blend of hydrocarbon propellants. A blend of propane and n-butane is a particularly useful propellant in conjunction with the adhesive compositions described herein.

Notwithstanding the usefulness and surprising compatibility of hydrocarbon propellant blends with the adhesive compositions, other propellants may be used for propelling the adhesive from its container. Such other propellants may include members of the group consisting of ethers, hydrofluorocarbons (HFC), and mixtures thereof. Representative propellants include dimethyl ether (DME) and diethyl ether; 1,1,1,2-tetrafluoroethane (HFC-134a), 1,1,1,2,3,3,3,-heptafluoropropane (HFC-227), difluoromethane (HFC-32), 1,1,1-trifluoroethane (HFC-143a), 1,1,2,2-tetrafluoroethane (HFC-134), and 1,1-difluoroethane (HFC-152a).

The amount of propellant used in connection with the adhesive will be governed by various factors, including container volume, nozzle size, and the like. These factors will be known to one of ordinary skill in the art. The amount of the propellant present in the aerosol adhesive composition, however, is typically at least 10 weight percent and preferably from about 10 to about 40 weight percent, more preferably from about 15 to about 25 weight percent of the total weight of the aerosol adhesive composition. When the saturated hydrocarbon propellant is present in an amount of from about 15 to about 25 weight percent, an initial pressure, namely, the pressure prior to spraying any adhesive from the container, of between about 40 pounds per square inch and 70 pounds per square inch may be obtained in the container.

The adhesive compositions of the present invention will have, a level of volatile organic compounds (VOC's), which is preferably below about 50% and more usefully, below about 45%, and still more usefully, below about 40%.

Adhesive compositions according to the present invention, may have a solids content of between about 15 and about 40%, and more usefully, about 20 to about 35% and still more usefully, about 25 to about 30%.

The adhesives of the present invention are particularly as pressure sensitive, repositionable adhesives. Accordingly, the adhesive is useful for spray application to a number of substrates, including, paper, wood, glass, plastic, and metal; however, it is particularly well suitable for application to paper.

The present invention will be better understood by reference to the following examples which are provided for purposes of illustration only and are not to be construed as limiting the scope of the present invention. As used herein, unless otherwise indicated, "parts" are "parts by weight".

Example 1

Adhesive Composition

An adhesive composition may be prepared by admixing the following materials:

| Material | Weight Percent |
| --- | --- |
| Acrylic Emulsion[1] | 49.11 |
| Deionized Water | 8.84 |
| Isopropyl Alcohol | 8.84 |
| Defoamer[2] | 0.98 |
| Corrosion Inhibitor[3] | 2.22 |

[1]Carbotac 2932 acrylic emulsion, available from Lubrizol.
[2]Foamex 822, available from Evonik.
[3]sodium benzoate (liquid phase) and ammonium hydroxide (vapor phase).

Example 2

Sprayable Adhesive Composition

A sprayable adhesive may be prepared by admixing the following materials:

| Material | Weight Percent |
| --- | --- |
| Adhesive composition of Example 1 | 70 |
| Hydrocarbon propellant blend (butane and propane @ 46 p.s.i.) | 30 |

The sprayable composition had a solids content of about 29%. The components of the sprayable composition were dispensed into a tin plated steel canister fitted with a nozzle and feed tube. The propellant in the canister resulted in an internal initial pressure of about 70 p.s.i.

Adhesive Strength Measures

A sample adhesive composition according to Example 2 of the present invention ("WB Adhesive") was tested in accordance with both ASTM D903-98 (Standard Test Method for Peel or Stripping Strength of Adhesive Bonds) and ASTM D1002-05 (Standard Test Method for Apparent Shear Strength of Single-Lap-Joint Adhesively Bonded Metal Specimens by Tension Loading (Metal-to-Metal)). The results of the peel strength and lap shear failing stress are provided in the following table, with comparison to a solvent-borne spray adhesive sold as Krylon® General Purpose Spray Adhesive ("Comp. Adhesive").

| Sample Description | Test Repetitions | Peel Strength (pli) | Test Repetitions | Lap-Shear Failing Stress (psi) |
|---|---|---|---|---|
| Comp. Adhesive | 5 | 2.36 ± 0.673 | 5 | 18.92 ± 7.33 |
| WB Adhesive | 5 | 3.22 ± 0.847 | 5 | 21.2 ± 6.61 |

While the invention has been shown and described with respect to particular embodiments thereof, those embodiments are for the purpose of illustration rather than limitation and other variations and modifications of the specific embodiments herein described will be apparent to those skilled in the art, all within the intended spirit and scope of the invention. Accordingly, the invention is not to be limited in scope and effect to the specific embodiments described herein, nor in any other way that is inconsistent with the extent to which the progress in the art has been advanced by the invention.

What is claimed is:

1. An aerosol spray adhesive composition comprising:
   a) a resin consisting essentially of an acrylic resin having a Tg from about minus 40° C. to about minus 20° C. and a particle size of about 250 to about 750 nm;
   b) at least one water miscible organic solvent selected from the group consisting of methanol, ethanol, propanol, butanol, and blends thereof;
   c) water;
   d) at least one hydrocarbon propellant selected from the group consisting of methane, ethane, propane, n-butane, iso-butane and mixtures thereof and,
   e) a defoamer.

2. The spray adhesive composition of claim 1, wherein the composition is substantially free of resin dispersants.

3. An aerosol adhesive composition comprising:
   a) about 60 to about 90 weight percent of an adhesive composition comprising:
      i. a resin consisting essentially of an acrylic resin having a Tg from about minus 40° C. to about minus 20° C. and a particle size of about 250 to about 750 nm;
      ii. at least one alcohol selected from the group consisting of methanol, ethanol, propanol, butanol, and blends thereof;
      iii. water; and
      iv. a defoamer; and
   b) about 10 to about 40 weight percent of a saturated hydrocarbon propellant selected from the group consisting of methane, ethane, propane, n-butane, iso-butane and mixtures thereof.

4. The spray adhesive composition of claim 1, wherein the acrylic resin has a particle size of about 450 to about 550 nm.

5. The aerosol adhesive composition of claim 3, wherein the adhesive composition further comprises a liquid phase corrosion inhibitor.

6. The aerosol adhesive composition of claim 5, wherein the adhesive composition has a viscosity of between about 40 and about 50 KU.

7. The aerosol adhesive composition of claim 6, wherein the adhesive composition has a pH of between 8 to 11.

8. The aerosol adhesive composition of claim 5, wherein the adhesive composition is substantially free of a resin dispersant.

9. The aerosol adhesive composition of claim 3, wherein the defoamer comprises about 0.2 to about 1.0 weight percent with respect to the total weight of the aerosol adhesive composition.

* * * * *